US012337712B2

(12) United States Patent
Hirose

(10) Patent No.: US 12,337,712 B2
(45) Date of Patent: Jun. 24, 2025

(54) ELECTRIC POWER SYSTEM

(71) Applicant: TOYOTA JIDOSHA KABUSHIKI KAISHA, Toyota (JP)

(72) Inventor: Haruka Hirose, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 808 days.

(21) Appl. No.: 17/572,934

(22) Filed: Jan. 11, 2022

(65) Prior Publication Data

US 2022/0242263 A1 Aug. 4, 2022

(30) Foreign Application Priority Data

Jan. 29, 2021 (JP) ................................. 2021-013414

(51) Int. Cl.
  *B60L 53/62* (2019.01)
  *B60L 53/51* (2019.01)
  *H02J 3/38* (2006.01)

(52) U.S. Cl.
  CPC .............. *B60L 53/62* (2019.02); *H02J 3/381* (2013.01); *B60L 2240/80* (2013.01)

(58) Field of Classification Search
  CPC ...... B60L 53/62; B60L 2240/80; B60L 53/51; B60L 53/64; H02J 3/381; H02J 7/35; H02J 3/322
  USPC ......................................................... 320/109
  See application file for complete search history.

(56) References Cited

U.S. PATENT DOCUMENTS

| 2011/0133556 | A1* | 6/2011 | Choi ......................... H02J 7/35 307/65 |
| 2014/0312841 | A1* | 10/2014 | Baba ....................... B60L 55/00 320/109 |
| 2015/0077056 | A1* | 3/2015 | Bridges ................... H02J 3/008 705/7.29 |
| 2018/0154778 | A1* | 6/2018 | Ota ....................... H02J 7/0068 |
| 2018/0186246 | A1 | 7/2018 | Kudo et al. |
| 2019/0074711 | A1* | 3/2019 | Go ........................... H02J 7/35 |
| 2019/0296575 | A1* | 9/2019 | Yang ...................... B60L 53/00 |

FOREIGN PATENT DOCUMENTS

| CN | 106356925 A | 1/2017 |
| JP | 2013-126350 A | 6/2013 |
| JP | 2017-046421 A | 3/2017 |
| JP | 2017-189012 A | 10/2017 |
| WO | WO 2017-009978 A1 | 1/2017 |

* cited by examiner

*Primary Examiner* — Julian D Huffman
*Assistant Examiner* — Lisa Kotowski
(74) *Attorney, Agent, or Firm* — Finnegan, Henderson, Farabow, Garrett, and Dunner, LLP

(57) ABSTRACT

An electric power system includes a vehicle on which a power storage device is mounted, a charging and discharging system that exchanges electric power between the vehicle and a facility external to the vehicle, a photovoltaic power generation device that supplies electric power generated using sunlight to the charging and discharging system, and a controller that stops the charging and discharging system based on any of a first condition, a second condition, and a third condition. The first condition is related to the amount of electric power exchanged between the power storage device and the facility, the second condition is related to a time when the power generated by the photovoltaic device is less than a threshold, and the third condition is related to an electricity rate.

4 Claims, 8 Drawing Sheets

ELECTRIC POWER SYSTEM

This nonprovisional application is based on Japanese Patent Application No. 2021-013414 filed on Jan. 29, 2021 with the Japan Patent Office, the entire contents of which are hereby incorporated by reference.

BACKGROUND

Field

The present disclosure relates to an electric power system that supplies and receives electric power between a vehicle-mounted power storage device and a building or the like.

Description of the Background Art

In a known technology, electric power is supplied and received between a vehicle-mounted power storage device and a building, a power network, or the like. For example, Japanese Patent Laying-Open No. 2017-046421 discloses the following technology. A vehicle-mounted power storage device is charged by using late-night power of low electricity rate, and electric power charged in the power storage device during daytime is used in a building to save an electricity rate or is supplied to a power network to mitigate a peak demand for electric power. The power storage device is also charged such that a state of charge (SOC) of the vehicle-mounted power storage device reaches a prescribed level at a desired timing, for example, when nobody is at home.

SUMMARY

To supply and receive electric power as described above with high responsiveness, a state in which electric power can be supplied and received between the vehicle-mounted power storage device and the building is maintained as long as no stop command is issued from, for example, a user of a management system that manages electric power to the power network. This maintains a conductive state of an electronic component such as a capacitor provided between the vehicle-mounted power storage device and the power network. As a result, the electronic component may degrade unnecessarily and have a shorter lifetime.

An object of the present disclosure is to provide an electric power system that reduces degradation of an electronic component provided between a vehicle-mounted power storage device and a power supply and reception target.

An electric power system according to an aspect of the present disclosure includes: a vehicle on which a power storage device is mounted; a charging and discharging system that supplies and receives electric power between the vehicle and a facility external to the vehicle; a photovoltaic power generation device that supplies electric power generated using sunlight to the charging and discharging system; a notification device that notifies a user of predetermined information; and a controller that notifies inquiry information using the notification device when at least any condition of a first condition, a second condition, and a third condition is satisfied, the inquiry information inquiring whether stop of the charging and discharging system is allowed. The first condition includes a condition that magnitude of the electric power supplied and received between the power storage device and the facility is smaller than a threshold. The second condition includes a condition that a present time is a time within a time period in which an amount of electric power generated by the photovoltaic power generation device is smaller than a threshold. The third condition includes a condition that (i) the present time is a time within a time period in which an electricity rate lower than an electricity rate of any other time period of a day is set, and (ii) an amount of electric power stored in the power storage device is within a prescribed range corresponding to a fully charged state.

Accordingly, the inquiry information that inquires whether stop of the charging and discharging system is allowed can be notified to urge the user to stop the charging and discharging system when the magnitude of the electric power supplied and received between the power storage device and the facility is smaller than a threshold, when the present time is a time within a time period in which an amount of electric power generated by the photovoltaic power generation device is smaller than a threshold, or when the present time is a time within a time period in which an electricity rate is lower than an electricity rate during any other time period of a day and the power storage device is fully charged. As the charging and discharging system is stopped by notification of the inquiry information, the conductive state between the power storage device and the facility is eliminated. Thus, unnecessary degradation of an electronic component can be reduced, and a decrease in the lifetime of the electronic component can be suppressed.

In one embodiment, the controller notifies the inquiry information using the notification device when the first condition and the third condition are satisfied.

Accordingly, the inquiry information that inquires whether stop of the charging and discharging system is allowed can be notified to urge the user to stop the charging and discharging system when the magnitude of the electric power supplied and received between the power storage device and the facility is smaller than a threshold, the present time is a time within a time period in which an electricity rate is lower than an electricity rate of any other period, and the power storage device is fully charged. As the charging and discharging system is stopped by the notification of the inquiry information, the conductive state between the power storage device and the facility is eliminated. Thus, unnecessary degradation of an electronic component can be reduced, and a decrease in the lifetime of the electronic component can be suppressed.

In another embodiment, the controller activates the charging and discharging system when the charging and discharging system is stopped and when a state in which at least any of the second condition and the third condition is satisfied changes to a state in which the at least any of the second condition and the third condition is not satisfied.

Accordingly, when the state in which at least any of the second condition and the third condition is satisfied changes to the state in which the at least any of the second condition and the third condition is not satisfied, it is highly likely that supply and reception of electric power will be requested between the power storage device and the facility. Thus, as the charging and discharging system is activated, electric power can be supplied and received between the power storage device and the facility with high responsiveness in response to a request.

An electric power control system according to another aspect of the present disclosure includes: a vehicle on which a power storage device is mounted; a charging and discharging system that supplies and receives electric power between the vehicle and a facility external to the vehicle; a photovoltaic power generation device that supplies electric power generated using sunlight to the charging and discharging system; and a controller that controls the charging and discharging system. The controller stops the charging and discharging system when all conditions of a first condition, a second condition, and a third condition are satisfied. The first condition includes a condition that magnitude of electric power supplied and received between the power storage device and the facility is smaller than a threshold. The second condition includes a condition that a present time is a time within a time period in which an amount of electric power generated by the photovoltaic power generation device is smaller than a threshold. The third condition includes a condition that (i) the present time is a time within a time period in which an electricity rate lower than an electricity rate of any other time period of a day is set, and (ii) an amount of electric power stored in the power storage device is within a prescribed range corresponding to a fully charged state.

Accordingly, the charging and discharging system is stopped when the present time is a time within a time period in which an amount of electric power generated by the photovoltaic power generation device is smaller than a threshold, the present time is a time within a time period in which an electricity rate is lower than an electricity rate of any other time period of a day, and the power storage device is fully changed charged. Thus, the conductive state between the power storage device and the facility can be eliminated, thereby reducing unnecessary degradation of an electronic component and suppressing a decrease in the lifetime of the electronic component.

In one embodiment, the controller activates the charging and discharging system when the charging and discharging system is stopped and when a state in which at least any of the second condition and the third condition is satisfied changes to a state in which the at least any of the second condition and the third condition is not satisfied.

Accordingly, when the state in which at least any of the second condition and the third condition is satisfied changes to the state in which the at least any of the second condition and the third condition is not satisfied, it is highly likely that supply and reception of electric power will be requested between the power storage device and the facility. Thus, as the charging and discharging system is activated, electric power can be supplied and received between the power storage device and the facility with high responsiveness in response to a request.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
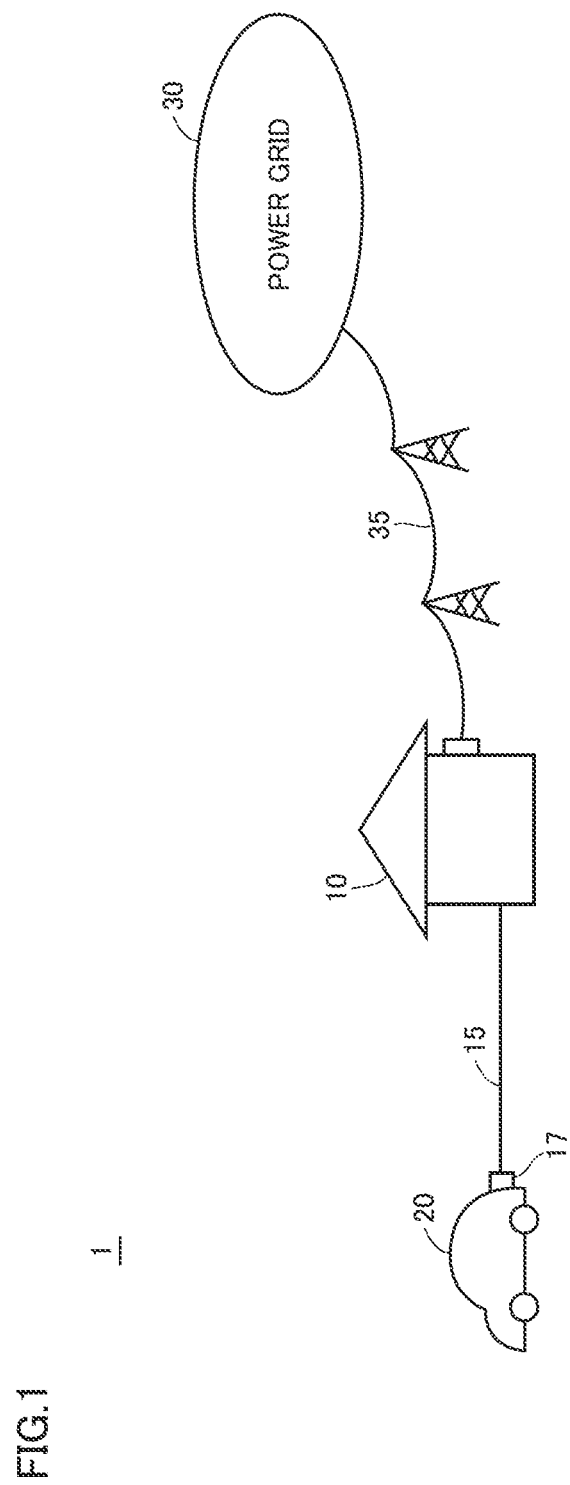
FIG. 1 shows a schematic configuration example of an electric power system.

An embodiment of the present disclosure will be described below in detail with reference to the drawings. The same or corresponding elements in the drawings have the same reference characters allotted, and description thereof will not be repeated.

FIG. 1 shows a schematic configuration example of an electric power system 1. As shown in FIG. 1, electric power system 1 includes a house 10, a vehicle 20, a connecting cable 15, a connecting connector 17, a power grid 30, and a power transmission line 35.

House 10 is connected to power transmission line 35 and can supply and receive electric power to and from power grid (power network) 30 through power transmission line 35. House 10 can also supply and receive electric power to and from vehicle 20 connected to house 10 by connecting cable 15 and connecting connector 17.

Vehicle 20 is an electric-powered vehicle on which a power storage device is mounted as a direct-current (DC) power supply and is, for example, a battery electric vehicle. Vehicle 20 is electrically connected to house 10 by connecting cable 15 and connecting connector 17. Vehicle 20 can generate electric power equivalent to commercial power and supply the generated commercial power to house 10, and can be supplied with electric power from house 10 and charge the power storage device. In other words, vehicle 20 can be used as one power supply of house 10. Alternatively, house 10 can supply electric power to power grid 30 by using vehicle 20 as a power supply.

Connecting cable 15 is a power line for electrically connecting vehicle 20 to house 10. Connecting connector 17 is a connector for electrically connecting connecting cable 15 to vehicle 20.

Power grid 30 is a commercial power system composed of a large number of power generation facilities that generate transmission line power. Power grid 30 is connected with various power generation facilities such as a thermal power plant, an atomic power plant, a wind power generation facility, a hydroelectric power generation facility, and a photovoltaic power generation facility, and is also connected with any other building such as a house or a facility. Also in such a building, power grid 30 can be supplied with electric power by using a power storage device as a power supply when a vehicle on which the power storage device is mounted is connected to the building.

Figure 2:
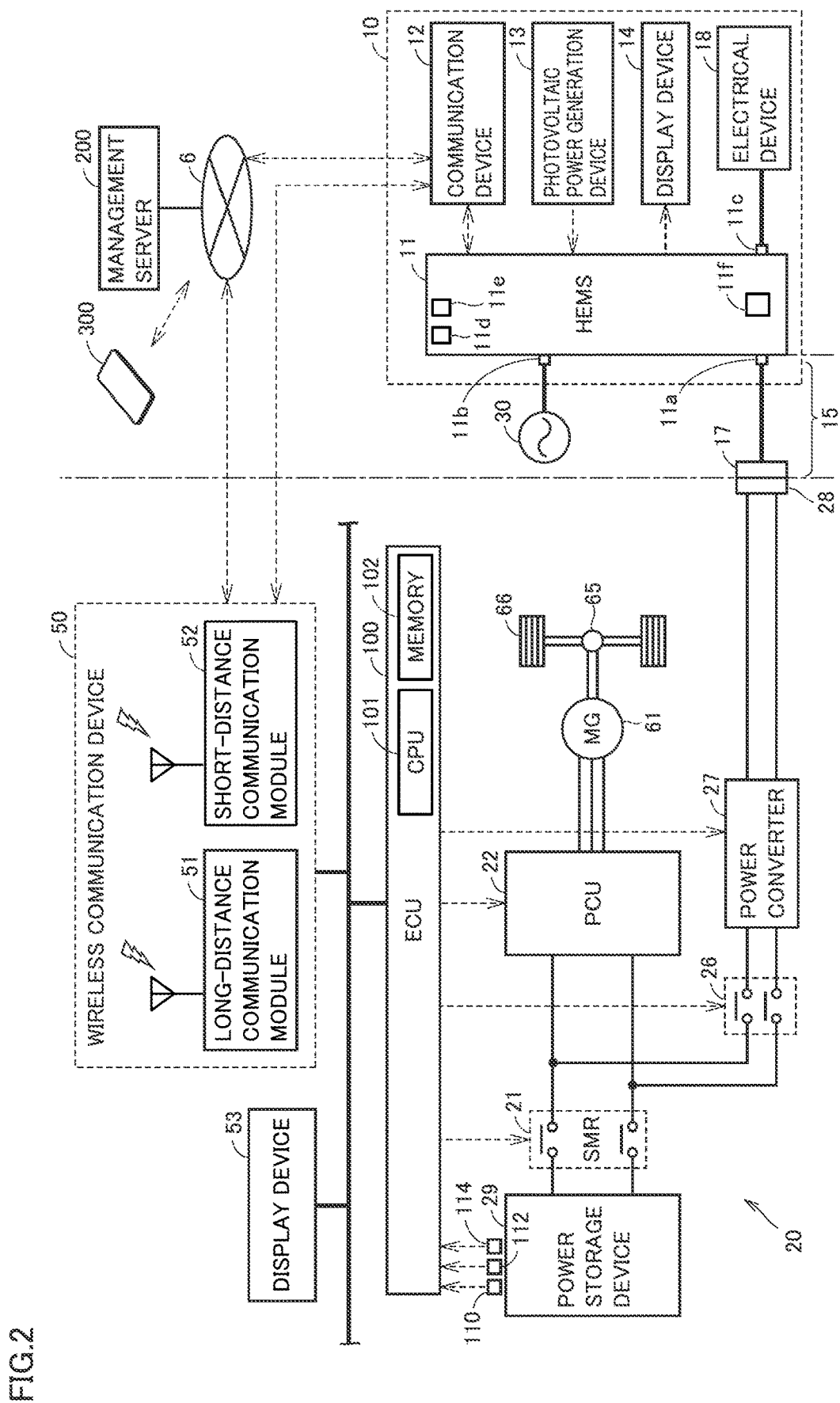
FIG. 2 shows configuration examples of a house and a vehicle shown in FIG. 1.

FIG. 2 shows configuration examples of house 10 and vehicle 20 shown in FIG. 1. As shown in FIG. 2, vehicle 20 includes a system main relay (SMR) 21, a power control unit (PCU) 22, a power storage device 29, a motor generator (MG) 61, a power transmission gear 65, driving wheels 66, and an electronic control unit (ECU) 100.

SMR 21 is a relay circuit electrically connected between power storage device 29 and PCU 22. Closing/opening of SMR 21 is controlled in accordance with a command from ECU 100.

PCU 22 exchanges electric power between power storage device 29 and MG 61 in accordance with a command from ECU 100. PCU 22 includes, for example, an inverter that receives electric power from power storage device 29 and drives MG 61 and a converter that adjusts a level of a DC voltage supplied to the inverter, which are not shown.

Power storage device 29 is a rechargeable DC power supply and includes, for example, a secondary battery such as a nickel metal hydride battery or a lithium ion battery having a liquid or solid electrolyte. Power storage device 29 may be a capacitor such as an electric double layer capacitor. Power storage device 29 supplies electric power for generating a travel driving force of vehicle 20 to PCU 22. Also, power storage device 29 is charged with electric power generated by regenerative braking of MG 61, is discharged by a driving operation of MG 61, is charged by electric power supplied from outside of the vehicle, or is discharged by supply of electric power to the outside of the vehicle.

MG 61 is a three-phase alternating-current (AC) rotating electric machine and is, for example, a permanent-magnet-type synchronous motor including a rotor with an embedded permanent magnet. MG 61 functions as an electric motor (motor) and as an electric generator (generator). MG 61 is connected to power storage device 29 via PCU 22.

MG 61 is driven by an inverter included in PCU 22, for example, during travel of vehicle 20. Motive power of MG 61 is transmitted to driving wheels 66 via power transmission gear 65 formed of a differential gear or the like. For example, during braking of vehicle 20, MG 61 is driven by driving wheels 66 and operates as a generator to perform regenerative braking. The electric power generated by MG 61 is stored in power storage device 29 via PCU 22.

Vehicle 20 further includes a charging/discharging relay 26, a power converter 27, and an inlet 28 as components for performing external charging or external power supply. Inlet 28 is coupled with connecting connector 17 of house 10. Connecting connector 17 is coupled to a home energy management system (HEMS) 11 of house 10 via connecting cable 15. FIG. 2 shows a state in which connecting connector 17 is attached to inlet 28, and connecting connector 17 is detachable from inlet 28. Connecting connector 17 is attached to inlet 28 when external charging or external power supply is performed, and connecting connector 17 is detached from inlet 28 when vehicle 20 is operated.

During external charging of power storage device 29, electric power is supplied to power converter 27 from the HEMS 11 side via connecting cable 15, connecting connector 17, and inlet 28. The supplied electric power is converted in power converter 27 into electric power (referred to as charging power below) with which power storage device 29 can be charged, and the converted charging power is supplied to power storage device 29.

Contrastingly, during external power supply of power storage device 29, electric power is converted into prescribed power (e.g., AC power) in power converter 27, and the converted AC power is supplied to HEMS 11 via inlet 28, connecting connector 17, and connecting cable 15.

Charging/discharging relay 26 is a relay circuit electrically connected between power storage device 29 and power converter 27. When charging/discharging relay 26 is closed and SMR 21 is closed, electric power can be transmitted between inlet 28 and power storage device 29.

Power converter 27 is electrically connected between charging/discharging relay 26 and inlet 28. Power converter 27 converts electric power supplied from HEMS 11 into charging power or converts electric power from power storage device 29 into electric power that can be supplied (e.g., AC power of AC 100V), in accordance with a command from ECU 100. The charging and discharging system in the present embodiment includes HEMS 11, connecting cable 15, connecting connector 17, SMR 21, charging/discharging relay 26, power converter 27, and inlet 28.

ECU 100 includes a CPU 101, a memory 102, an input/output (I/O) port (not shown) for input and output of various signals, and the like. ECU 100 controls various devices (such as SMR 21, PCU 22, charging/discharging relay 26, and power converter 27) in vehicle 20 such that vehicle 20 enters a desired state. Various types of control performed by ECU 100 are performed by software processing, that is, as a program stored in memory 102 is read by CPU 101. Various types of control by ECU 100 may be processed not only by software processing but also by dedicated hardware (electronic circuit).

ECU 100 is connected with a battery temperature sensor 110, a battery current sensor 112, and a battery voltage sensor 114.

Battery temperature sensor 110 detects a temperature TB at a prescribed location of power storage device 29 (e.g., a location with the highest temperature in power storage device 29) and transmits a signal indicating the detected temperature TB to ECU 100. Battery current sensor 112 detects a current IB flowing through power storage device 29 and transmits a signal indicating the detected current IB to ECU 100. Battery voltage sensor 114 detects a voltage VB between the terminals of power storage device 29 and transmits a signal indicating the detected voltage VB to ECU 100.

Vehicle 20 further includes a wireless communication device 50 and a display device 53. Wireless communication device 50 is configured to communicate various types of information or the like with the outside of the vehicle. Wireless communication device 50 includes a long-distance communication module 51 and a short-distance communication module 52. Long-distance communication module 51 includes, for example, a long term evolution (LTE) communication module. Long-distance communication module 51 is configured to perform bidirectional data communication with a base station (not shown) in a communication network 6. Short-distance communication module 52 is configured to perform bidirectional data communication with a mobile terminal 300 of a user of vehicle 20 or with house 10, which is within a short distance (e.g., about several meters to about several tens of meters) from vehicle 20. Vehicle 20 may be configured to perform data communication with house 10 via long-distance communication module 51 and communication network 6 or perform data communication directly with house 10 via short-distance communication module 52.

ECU 100 transmits various types of information (such as positional information of vehicle 20) to house 10 or receives information from house 10 via wireless communication device 50.

Display device 53 is provided at a position (e.g., instrument panel or the like) visually recognizable by a driver during driving of vehicle 20. Display device 53 is formed of, for example, a liquid crystal display, an organic electro luminescence (EL), or the like. Display device 53 displays text information, an image, or the like in accordance with a control signal from ECU 100.

ECU 100 calculates the SOC of power storage device 29, for example, during driving of vehicle 20, or when vehicle 20 is parked and connecting connector 17 is connected to inlet 28 to allow electric power to be supplied and received between house 10 and power storage device 29.

The SOC calculation method may be, for example, various known techniques such as a technique using a current value integration (Coulomb counting) or a technique using estimation of open circuit voltage (OCV).

House 10 includes HEMS 11, a communication device 12, a photovoltaic power generation device 13, a display device 14, and an electrical device 18.

HEMS 11 is formed of, for example, a power board, a power converter, a controller, and the like. HEMS 11 is electrically connected with photovoltaic power generation device 13, electrical device 18, vehicle 20, and power grid 30. HEMS 11 is provided with an I/O unit 11a that supplies and receives electric power to and from vehicle 20, an I/O unit 11b that supplies and receives electric power to and from power grid 30, an output unit 11c for supplying electric power to electrical device 18, and a relay 11f electrically connected between photovoltaic power generation device 13, power grid 30 and I/O unit 11a.

HEMS 11 further includes a CPU 11d and a memory 11e. HEMS 11 controls various devices in HEMS 11 such that the state in which electric power is supplied and received to and from each connection target is a desired state. Various types of control performed by HEMS 11 are performed by software processing, that is, as a program stored in memory 11e is read by CPU 11d. Various types of control by HEMS 11 may be processed not only by software processing but also by dedicated hardware (electronic circuit).

HEMS 11 adjusts, for example, an amount of electric power supplied from power grid 30 or photovoltaic power generation device 13 to electrical device 18 or vehicle 20. Alternatively, HEMS 11 adjusts, for example, an amount of electric power supplied from vehicle 20 to electrical device 18 or power grid 30.

Communication device 12 is configured to communicate with wireless communication device 50 of vehicle 20 through prescribed wireless communication or communication via communication network 6.

Photovoltaic power generation device 13 is a power generation device that generates electric power by converting light energy of sunlight into electrical energy. Photovoltaic power generation device 13 supplies the generated electric power to HEMS 11.

Display device 14 is provided at a position visually recognizable by a user in house 10. Display device 14 is formed of, for example, a liquid crystal display, an organic EL, or the like. Display device 14 displays text information, an image, or the like in accordance with a control signal from HEMS 11. Electrical device 18 includes, for example, a household electrical appliance provided in house 10.

When connecting connector 17 is connected to inlet 28 of vehicle 20, HEMS 11 supplies electric power of power storage device 29 to electrical device 18 in house 10 or supplies electric power generated in photovoltaic power generation device 13 or electric power from power grid 30 to vehicle 20. In the description below, such an operation of supplying and receiving electric power between house 10 and vehicle 20 is referred to as "V2H operation". For example, HEMS 11 may perform the V2H operation when connecting connector 17 is connected to inlet 28 of vehicle 20 or perform the V2H operation when accepting a request signal for performing the V2H operation from at least any of house 10, vehicle 20, a management server 200, and mobile terminal 300 while connecting connector 17 is connected to inlet 28.

Management server 200 is configured to communicate with house 10, vehicle 20, and mobile terminal 300 via communication network 6. Management server 200 receives various types of information from each of house 10, vehicle 20, and mobile terminal 300 via communication network 6 or transmits various types of information to each of house 10, vehicle 20, and mobile terminal 300 via communication network 6.

Mobile terminal 300 is a terminal that can be carried by a user and includes, for example, a display device, an input device, and a communication device (which are not shown). The communication device of mobile terminal 300 is configured to communicate with house 10, vehicle 20, and management server 200 via communication network 6.

Management server 200 receives a prescribed signal from vehicle 20 and transmits a display request signal to mobile terminal 300 so as to perform a display corresponding to the received prescribed signal, or receives a signal indicating a result of input to the input device of mobile terminal 300 and transmits a control request signal to vehicle 20 so as to perform control corresponding to the received signal indicating the result of input.

In electric power system 1 configured as described above, electric power is supplied and received between power storage device 29 mounted on vehicle 20 and house 10 or power grid 30.

In order to supply and receive electric power as described above with high responsiveness, a state in which electric power can be supplied and received between power storage device 29 mounted on vehicle 20 and house 10 is maintained as long as there is no stop command from the user, HEMS 11 that manages electric power to power grid 30, or management server 200. This maintains the conductive state of an electronic component such as a capacitor provided in the charging and discharging system between power storage device 29 and house 10. As a result, the electronic component may degrade unnecessarily and have a shorter lifetime.

In the present embodiment, thus, ECU 100 notifies inquiry information inquiring whether stop of the charging and discharging system is allowed when a first condition, a second condition, and a third condition described below are satisfied. The first condition incudes a condition that the magnitude of electric power supplied and received between power storage device 29 and a facility is smaller than a threshold. The second condition includes a condition that the present time is a time within a time period in which an amount of electric power generated by photovoltaic power generation device 13 is smaller than a threshold. The third condition includes a condition that the present time is a time within a time period in which an electricity rate lower than that of any other time period of a day is set and the SOC, which indicates the amount of electric power stored in power storage device 29, is within a prescribed range corresponding to a fully charged state.

As a result, the user can be urged to stop the charging and discharging system. If the charging and discharging system is stopped by notification of inquiry information, the conductive state between power storage device 29 and house 10 is eliminated. Thus, unnecessary degradation of an electronic component provided in the charging and discharging system between power storage device 29 and house 10 can be reduced, and a decrease in the lifetime of the electronic component can be suppressed.

Figure 3:
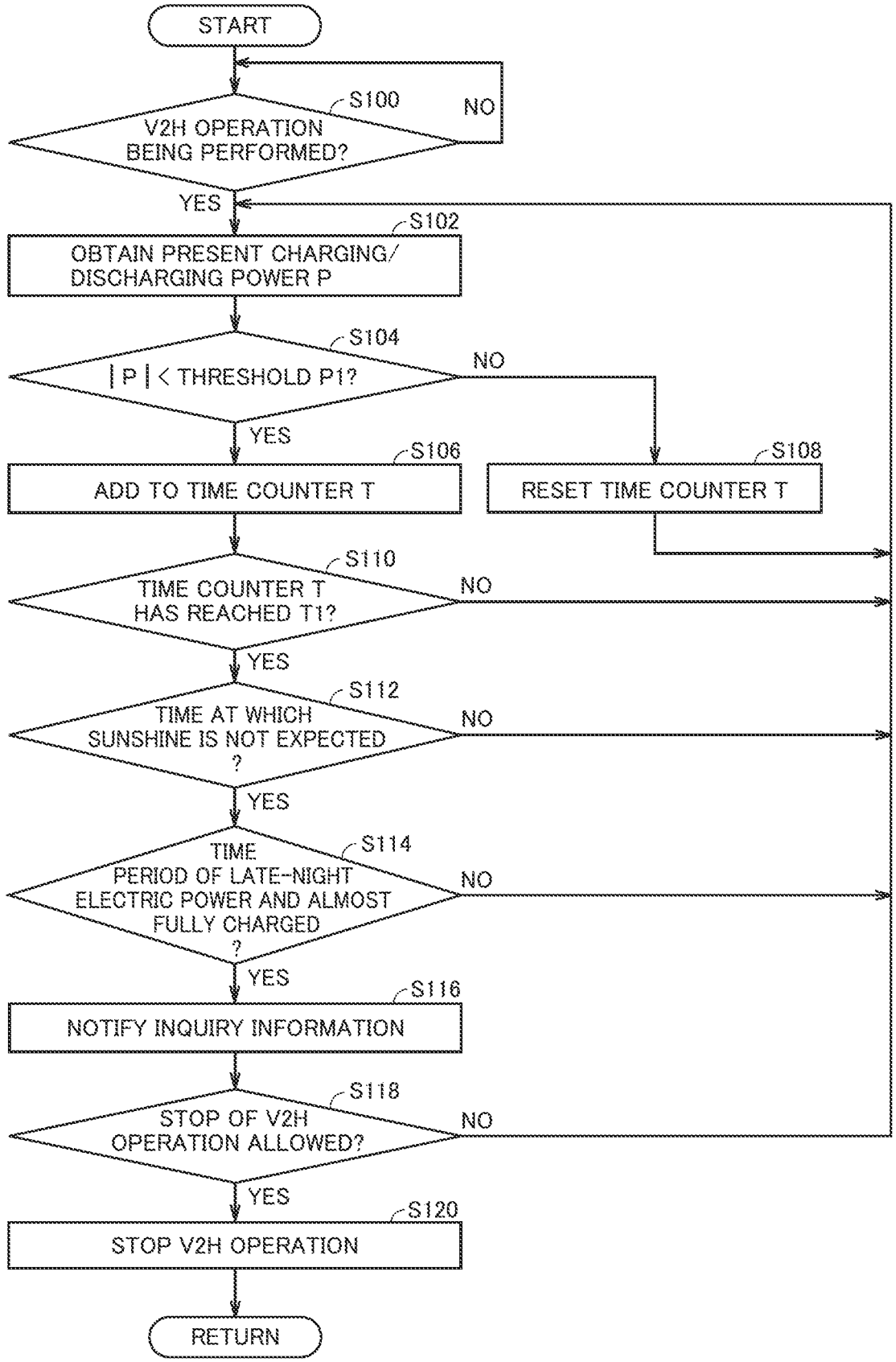
FIG. 3 is a flowchart showing an example process performed by an ECU.

A process performed by ECU 100 will be described below with reference to FIG. 3. FIG. 3 is a flowchart showing an example process performed by ECU 100.

At step (a step will be referred to as S below) 100, ECU 100 determines whether the V2H operation is being performed.

ECU 100 determines that the V2H operation is being performed when a flag indicating that the V2H operation is being performed is in ON state. For example, when connecting connector 17 is connected to inlet 28 of vehicle 20 and ECU 100 receives a signal indicating a request to perform the V2H operation, ECU 100 performs the V2H operation and also sets the flag indicating that the V2H operation is being performed to ON state.

The signal indicating a request to perform the V2H operation is transmitted from HEMS 11 to vehicle 20 when a prescribed operation to a prescribed operation device in house 10 is accepted. Alternatively, the signal indicating a request to perform the V2H operation is transmitted from mobile terminal 300 to vehicle 20 upon acceptance of a prescribed operation to the input device of mobile terminal 300. Still alternatively, the signal indicating a request to perform the V2H operation is transmitted from management server 200 to vehicle 20 during a power supply and demand adjustment period in which electric power is supplied and received between power storage device 29 of vehicle 20 and power grid 30. When ECU 100 determines that the V2H operation is being performed (YES at S100), the process proceeds to S102.

At S102, ECU 100 obtains present charging/discharging power P. For example, ECU 100 obtains the product of current IB obtained using battery current sensor 112 and voltage VB obtained using battery voltage sensor 114 as present charging/discharging power P.

At S104, ECU 100 determines whether the absolute value (magnitude) of charging/discharging power P is smaller than a threshold P1. Threshold P1, which is a predetermined value, is a value for determining that electric power has not been supplied and received between power storage device 29 and HEMS 11. When ECU 100 determines that the absolute value of charging/discharging power P is smaller than threshold P1 (YES at S104), the process proceeds to S106. When ECU 100 determines that the absolute value of charging/discharging power P is not less than threshold P1 (NO at S104), the process proceeds to S108.

At S106, ECU 100 performs addition to a time counter T. Specifically, ECU 100 adds a value predetermined to a value stored in memory 102 as time counter T. ECU 100 updates a value indicating time counter T stored in memory 102 using the added value.

At S108, ECU 100 resets time counter T. Specifically, ECU 100 sets a value stored in memory 102 as time counter T to an initial value (e.g., zero). ECU 100 then returns the process to S102.

At S110, ECU 100 determines whether time counter T has reached T1. ECU 100 determines that time counter T has reached T1, for example, when the value indicating time counter T is a value not less than T1. T1 is a value corresponding to a predetermined time, and the predetermined time is, for example, a time of about several tens of minutes. When ECU 100 determines that time counter T has reached T1 (YES at S110), the process proceeds to S112. When time counter T has not reached T1 (NO at S110), the process returns to S102.

At S112, ECU 100 determines whether the present time is a time at which sunshine is not expected. ECU 100 determines that the present time is a time at which sunshine is not expected when the present time is a time within a predetermined time period. The predetermined time period is a time period in which an amount of electric power generated per prescribed time in photovoltaic power generation device 13 is not greater than a threshold. The predetermined time period includes, for example, a time period corresponding to the evening or nighttime with no sunlight. The present time may be obtained using a clock device (not shown) or may be obtained from HEMS 11, management server 200, or mobile terminal 300. When ECU 100 determines that the present time is a time at which sunshine is not expected (YES at S112), the process proceeds to S114. When ECU 100 determines that the present time is not a time at which sunshine is not expected (NO at S112), the process returns to S102.

At S114, ECU 100 determines whether the present time is a time within a time period of late-night electric power and power storage device 29 is almost fully charged.

The time period of late-night electric power is a time period in which an electricity rate lower than the electricity rate during daytime of a day is set, which is a predetermined time period. The time period of late-night electric power may be stored in memory 102 in advance or may be received from management server 200 or the like and stored in memory 102.

For example, when the SOC of power storage device 29 is greater than a threshold SOC (0), ECU 100 determines that power storage device 29 is almost fully charged. When ECU 100 determines that the present time is within the time period of late-night electric power and power storage device 29 is almost fully charged (YES at S114), the process proceeds to S116. When ECU 100 determines that the present time is not a time within the time period of late-night electric power or when ECU 100 determines that power storage device 29 is not almost fully charged (NO at S114), the process returns to S102.

At S116, ECU 100 notifies inquiry information. ECU 100 notifies, for example, information that inquires whether stop of the V2H operation is allowed as inquiry information. ECU 100 transmits a request signal to HEMS 11 to cause display device 14 to display the inquiry information. In response to the request signal from ECU 100, HEMS 11 causes display device 14 to display the information that inquires whether stop of the V2H operation is allowed. The information displayed on display device 14 includes, for example, text information or information including an image or the like.

When the inquiry information is displayed by display device 14, the user may select whether to allow stop of the V2H operation by operating an operation device (not shown) provided integrally with display device 14 in house 10, such as a touch panel display, or an operation device (not shown) provided separately from display device 14. When the operation of allowing stop of the V2H operation is performed on the operation device in house 10, HEMS 11 transmits, to vehicle 20, a signal indicating that stop of the V2H operation is allowed by the user.

At S118, ECU 100 determines whether stop of the V2H operation has been allowed. ECU 100 determines that stop of the V2H operation has been allowed, for example, when receiving a signal indicating that stop of the V2H operation has been allowed by the user from HEMS 11 before a lapse of a predetermined period from the timing of notification of inquiry information. When ECU 100 determines that stop of the V2H operation has been allowed (YES at S118), the process proceeds to S120. When ECU 100 determines that stop of the V2H operation has not been allowed (NO at S118), the process returns to S102.

At S120, ECU 100 stops the V2H operation. ECU 100 transmits a request signal that requests HEMS 11 to stop the V2H operation to HEMS 11 and performs processing of stopping power converter 27. In this stop processing, ECU 100 stops the operation of power converter 27 and opens charging/discharging relay 26 and SMR 21. HEMS 11 opens relay 11*f* inside thereof in response to a request signal from ECU 100. Consequently, house 10 and vehicle 20 are electrically disconnected from each other.

Description will be given to an operation of ECU 100 mounted on vehicle 20 in the present embodiment based on the structure and flowchart as described above.

For example, when vehicle 20 is parked in a parking lot of house 10, connecting connector 17 is connected to inlet 28, and an operation of requesting execution of the V2H operation is performed on mobile terminal 300, a request signal that requests the execution of the V2H operation is transmitted from mobile terminal 300 via communication network 6 to HEMS 11 of house 10. When receiving the request signal from mobile terminal 300, HEMS 11 closes relay 11f and transmits the signal that requests execution of the V2H operation to ECU 100. Upon receipt of the signal indicating a request to perform the V2H operation from HEMS 11, ECU 100 closes each of SMR 21 and charging/discharging relay 26. As a result, electric power from photovoltaic power generation device 13 or power grid 30 can be supplied to power storage device 29 or electric power of power storage device 29 can be supplied to electrical device 18 or power grid 30, and accordingly, electric power supplied and received between house 10 and vehicle 20 is adjusted by HEMS 11. At this time, a flag indicating that the V2H operation is being performed is in ON state.

When the V2H operation is being performed (YES at S100), present charging/discharging power P is obtained from the product of battery current IB and battery voltage VB (S102). When the absolute value of the obtained charging/discharging power P is not less than threshold P1 (NO at S104), for example, through charging of power storage device 29 with electric power supplied from HEMS 11, time counter T is reset to the initial value (S108), and processing of obtaining present charging/discharging power P is repeated (S102).

When the absolute value of the obtained charging/discharging power P is smaller than threshold P1 (YES at S104), for example, through stopping of charging after power storage device 29 has been fully charged, time counter T is added (S106) When the state in which the absolute value of charging/discharging power P is smaller than threshold P1 continues and time counter T reaches T1 (YES at S110), ECU 100 determines whether the present time is a time at which sunshine is not expected (S112). When the present time is a time within a predetermined time period (YES at S112), ECU 100 further determines whether the present time is a time within a time period of late-night electric power and power storage device 29 is almost fully charged in which the SOC of power storage device 29 is greater than threshold SOC (0) (S114).

When determining that the present time is a time within a time period of late-night electric power and power storage device 29 is almost fully charged (YES at S114), ECU 100 notifies inquiry information that inquires whether stop of the V2H operation is allowed (S116). In other words, a request signal that requests display of the inquiry information is output to HEMS 11. When HEMS 11 receives the request signal, text information and an image are displayed on display device 14. Subsequently, when the user performs the operation of allowing stop of the V2H operation in the operation device of house 10, a signal indicating that stop of the V2H operation is allowed by the user is transmitted from HEMS 11 to ECU 100.

When stop of the V2H operation is allowed (YES at S118), the V2H operation is stopped (S120). Thus, stop processing is performed in each of ECU 100 and HEMS 11, so that SMR 21 and charging/discharging relay 26 of vehicle 20 are opened and relay 11f of HEMS 11 is opened. As a result, house 10 and vehicle 20 are electrically disconnected from each other.

As described above, in electric power system 1 according to the present embodiment, inquiry information that inquires whether stop of the V2H operation performed by the charging and discharging system is allowed is notified when the absolute value of charging/discharging power P is smaller than a threshold, the present time is a time within a time period in which an amount of electric power generated per prescribed time by photovoltaic power generation device 13 is small, the present time is a time within a time period of late-night electric power in which an electricity rate is lower than that of a time period of daytime of a day, and power storage device 29 is almost fully charged. Thus, the user can be urged to stop the V2H operation by notification of the inquiry information. When the user allows stop of the V2H operation by notification of the inquiry information, the V2H operation is stopped, thus eliminating the conductive state between power storage device 29 and house 10. Thus, unnecessary degradation of an electronic component can be reduced, and a decrease in the lifetime of the electronic component can be suppressed. Therefore, an electric power system can be provided that reduces degradation of an electronic component provided in an electrical circuit between a vehicle-mounted power storage device and a power supply and reception target.

Variations will be described below.

Although the above embodiment has provided description assuming that threshold P1 and T1 are determined in advance, they may be, for example, values that can be changed by the user. A notification frequency can thus be changed, resulting in a notification frequency that suits user's taste.

Although the above embodiment has provided description assuming that vehicle 20 is a battery electric vehicle, it suffices that vehicle 20 is a vehicle with a vehicle-mounted power storage device that can supply electric power to house 10 or receive electric power from house 10 for charging. Vehicle 20 may be, for example, a hybrid electric vehicle or a fuel cell electric vehicle on which a power storage device is mounted.

Although the above embodiment has provided description assuming that house 10 and vehicle 20 perform communication using the wireless communication device, for example, wired communication such as power line communication (PLC) via connecting cable 15 may be performed.

Although the above embodiment has provided description assuming that charging/discharging power P is obtained from the product of battery current IB and battery voltage VB, for example, a voltage sensor and a current sensor may be provided in inlet 28, and charging/discharging power P may be obtained using detection results of these sensors. Alternatively, a signal indicating detection results of a voltage sensor and a current sensor provided in HEMS 11 may be received from HEMS 11, and ECU 100 may obtain charging/discharging power P.

Although the above embodiment has provided description assuming that inquiry information is displayed on display device 14, inquiry information may be displayed on a display device of mobile terminal 300 in place of, or in addition to, display device 14. ECU 100 may transmit a display request signal directly to mobile terminal 300 or indirectly via communication network 6 and management server 200. The user may operate the input device of mobile terminal 300 to select whether to allow stop of the V2H operation. Further, inquiry information may be displayed on display device 53 in place of, or in addition to, display device 14. The user may operate the operation device in vehicle 20 to select whether to allow stop of the V2H operation.

Although the above embodiment has provided description assuming that a time period for determining whether the present time is a time at which sunshine is not expected is determined in advance, ECU 100 may obtain history of dates and amounts of electric power, each generated per prescribed time by photovoltaic power generation device 13, which is stored in HEMS 11, and set a time period for determining whether the present time is a time at which sunshine is not expected using the obtained history. Alternatively, ECU 100 may obtain data corresponding to a weather forecast from management server 200 and set a time period for determining whether the present time is a time at which sunshine is not expected in association with the current weather.

Although the above embodiment has provided description assuming that inquiry information is notified visually by displaying text information, an image, or the like on the display device, inquiry information may be notified aurally by voice or the like.

Although the above embodiment has provided description assuming that inquiry information that inquires whether stop of the V2H operation performed by the charging and discharging system is allowed is notified when the first condition that the magnitude of electric power supplied and received between power storage device 29 and house 10 is small, the second condition that the present time is a time within a time period in which an amount of electric power generated by photovoltaic power generation device 13 is small, and the third condition that the present time is a time within a time period in which an electricity rate is lower than an electricity rate of any other time period of a day and power storage device 29 is fully charged are satisfied, the present disclosure is not particularly limited to such control. For example, ECU 100 may notify inquiry information when any condition of the first condition, the second condition, and the third condition is satisfied.

Figure 4:
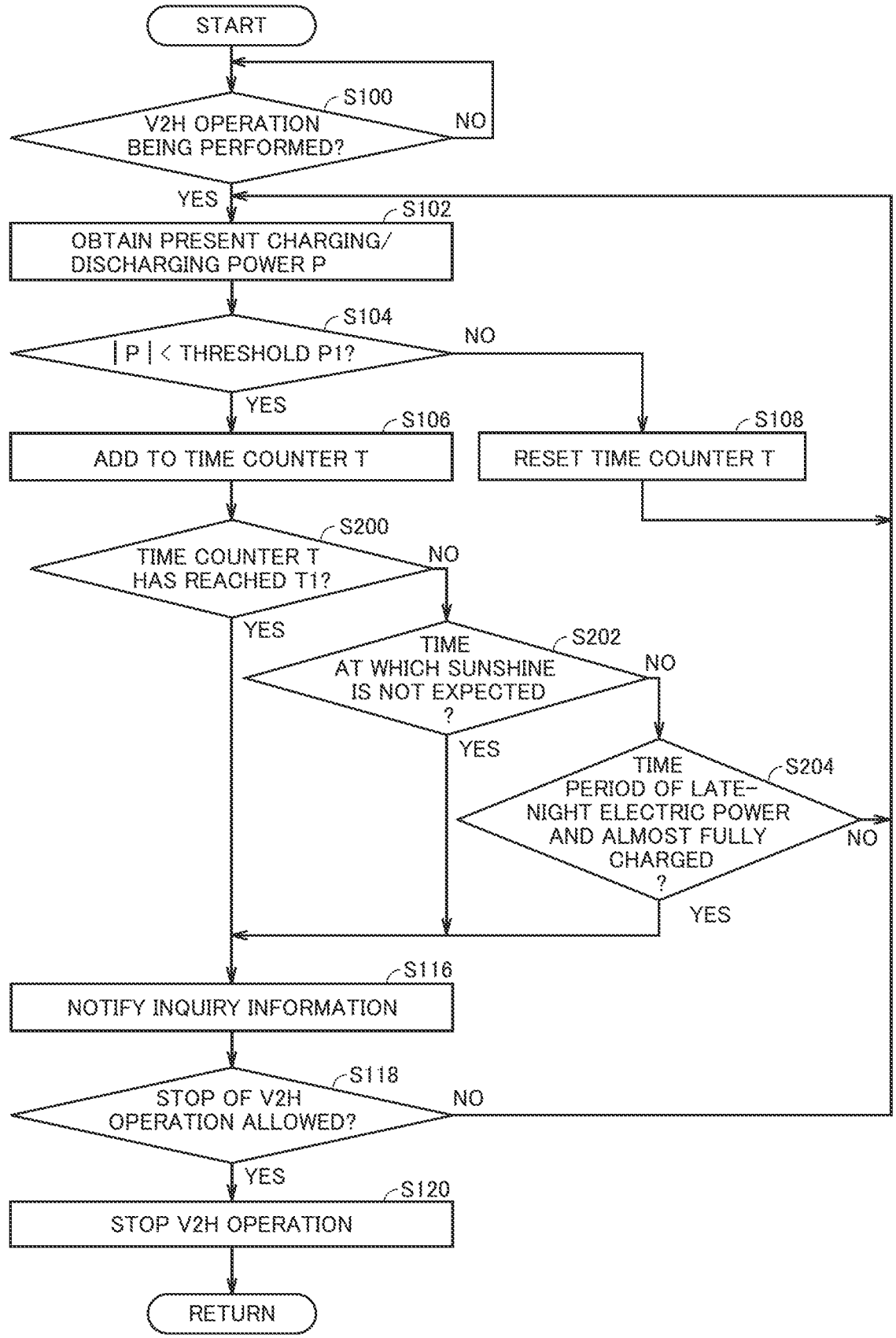
FIG. 4 is a flowchart (No. 1) showing an example process performed by an ECU in a variation.

An example process performed by ECU 100 in a variation will be described below with reference to FIG. 4. FIG. 4 is a flowchart (No. 1) showing an example process performed by ECU 100 in a variation. The flowchart of FIG. 4 is different from the flowchart of FIG. 3 in that processing of S200, processing of S202, and processing of S204 are included in place of processing of S110, processing of S112, and processing of S114. Any other processing, which is the same as the processing of the flowchart shown in FIG. 3, has the same step number allotted. Thus, detailed description of such processing will not be repeated except for the point described below.

As shown in the flowchart of FIG. 4, when time counter T is added (S106), the process proceeds to S200. At S200, ECU 100 determines whether time counter T has reached T1. When ECU 100 determines that time counter T has reached T1 (YES at S200), the process proceeds to S116. When ECU 100 determines that time counter T has not reached T1 (NO at S200), the process proceeds to S202.

At S202, ECU 100 determines whether the present time is a time at which sunshine is not expected. When ECU 100 determines that the present time is a time at which sunshine is not expected (YES at S202), the process proceeds to S116. The process proceeds to S204 when ECU 100 determines that the present time is not a time at which sunshine is not expected (NO at S202).

At S204, ECU 100 determines whether the present time is a time within a time period of late-night electric power and whether power storage device 29 is almost fully charged. When ECU 100 determines that the present time is a time within a time period of late-night electric power and power storage device 29 is almost fully charged (YES at S204), the process proceeds to S116. When ECU 100 determines that the present time is not a time within a time period of late-night electric power or power storage device 29 is not almost fully charged (NO at S204), the process returns to S102. Thus, inquiry information is notified when at least any condition of the first condition, the second condition, and the third condition is satisfied, and accordingly, the user can be urged to stop the V2H operation.

Although the above embodiment has provided description assuming that inquiry information is notified when the first condition, the second condition, and the third condition are satisfied, for example, ECU 100 may notify inquiry information when the first condition and the third condition are satisfied.

Figure 5:
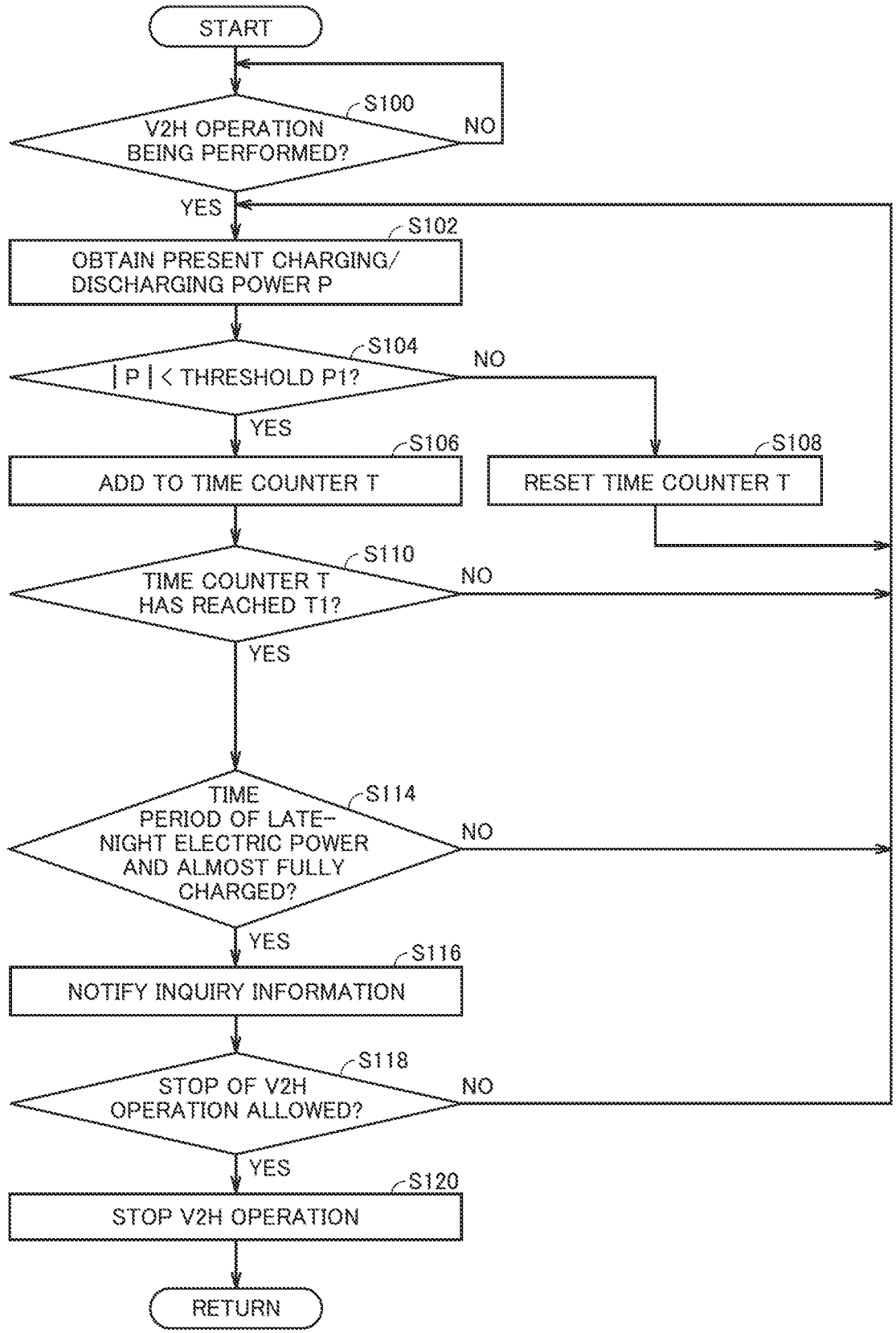
FIG. 5 is a flowchart (No. 2) showing an example process performed by an ECU in a variation.

An example process performed by ECU 100 in another variation will be described with reference to FIG. 5. FIG. 5 is a flowchart (No. 2) showing an example process performed by ECU 100 in the variation. The flowchart of FIG. 5 is different from the flowchart of FIG. 3 in that processing of S112 is omitted. Any other processing, which is the same as the processing of the flowchart shown in FIG. 3, has the same step number allotted. Thus, detailed description of such processing will not be repeated except for the point described below.

As shown in the flowchart of FIG. 5, the process proceeds to S114 when ECU 100 determines that time counter T has reached T1 (YES at S110).

Thus, when the first condition and the third condition are satisfied, inquiry information is notified, thus urging the user to stop the V2H operation.

Although the above embodiment has provided description assuming that inquiry information is notified when the first condition, the second condition, and the third condition are satisfied, the V2H operation may be stopped when the first condition, the second condition, and the third condition are satisfied.

Figure 6:
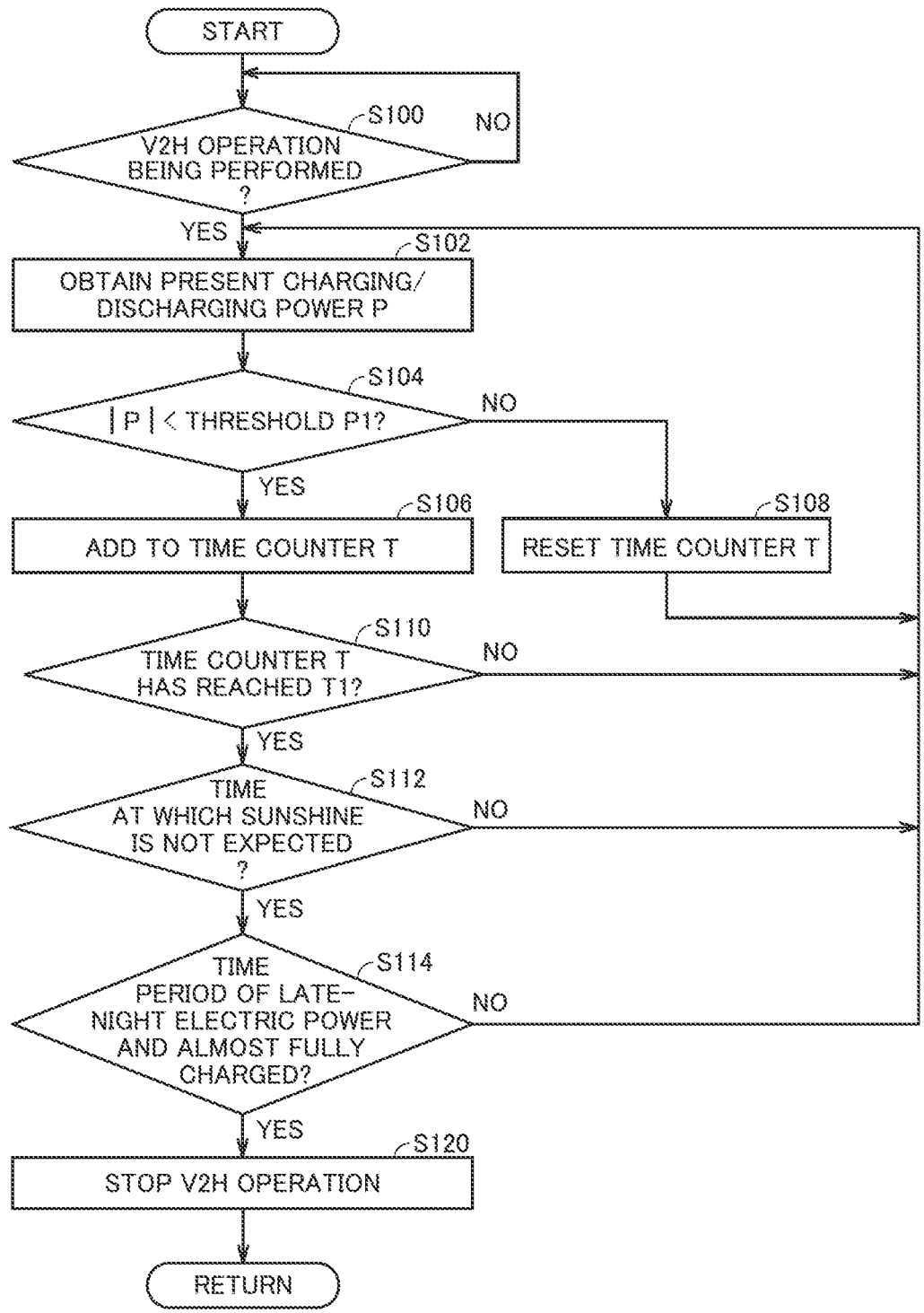
FIG. 6 is a flowchart (No. 3) showing an example process performed by an ECU in a variation.

An example process performed by ECU 100 in another variation will be described below with reference to FIG. 6. FIG. 6 is a flowchart (No. 3) showing an example process performed by ECU 100 in the variation. The flowchart of FIG. 6 is different from the flowchart of FIG. 3 in that processing of S116 and processing of S118 are omitted. Any other processing, which is the same as the processing of the flowchart shown in FIG. 3, has the same step number allotted. Thus, detailed description of such processing will not be repeated except for the point described below.

As shown in the flowchart of FIG. 6, the process proceeds to S120 when ECU 100 determines that the present time is a time within a time period of late-night electric power and power storage device 29 is almost fully charged (YES at S114).

Thus, when the first condition, the second condition, and the third condition are satisfied, the V2H operation is stopped, thereby eliminating the conductive state between power storage device 29 and house 10. Thus, unnecessary degradation of an electronic component can be reduced, and a decrease in the lifetime of the electronic component can be suppressed.

Although the above embodiment has provided description assuming that inquiry information is notified when the first condition, the second condition, and the third condition are satisfied, inquiry information may be notified when a fourth condition is satisfied in addition to the first condition, the second condition, and the third condition.

The fourth condition includes a condition that a discharge prohibition count of an auxiliary battery is greater than a threshold N1. An auxiliary battery (not shown), which supplies electric power to an auxiliary machine (including ECU 100) to be mounted on vehicle 20, is mounted on vehicle 20. ECU 100 detects a remaining amount or a voltage of the auxiliary battery using a sensor or the like. ECU 100 prohibits discharging of the auxiliary battery when the detected remaining amount is not greater than a threshold or when the voltage is not greater than a threshold. When prohibiting discharging of the auxiliary battery, ECU 100 counts a discharge prohibition count. It is thus revealed that the state in which vehicle 20 is continuously unattended continues longer as the discharge prohibition count of the auxiliary battery is greater.

Figure 7:
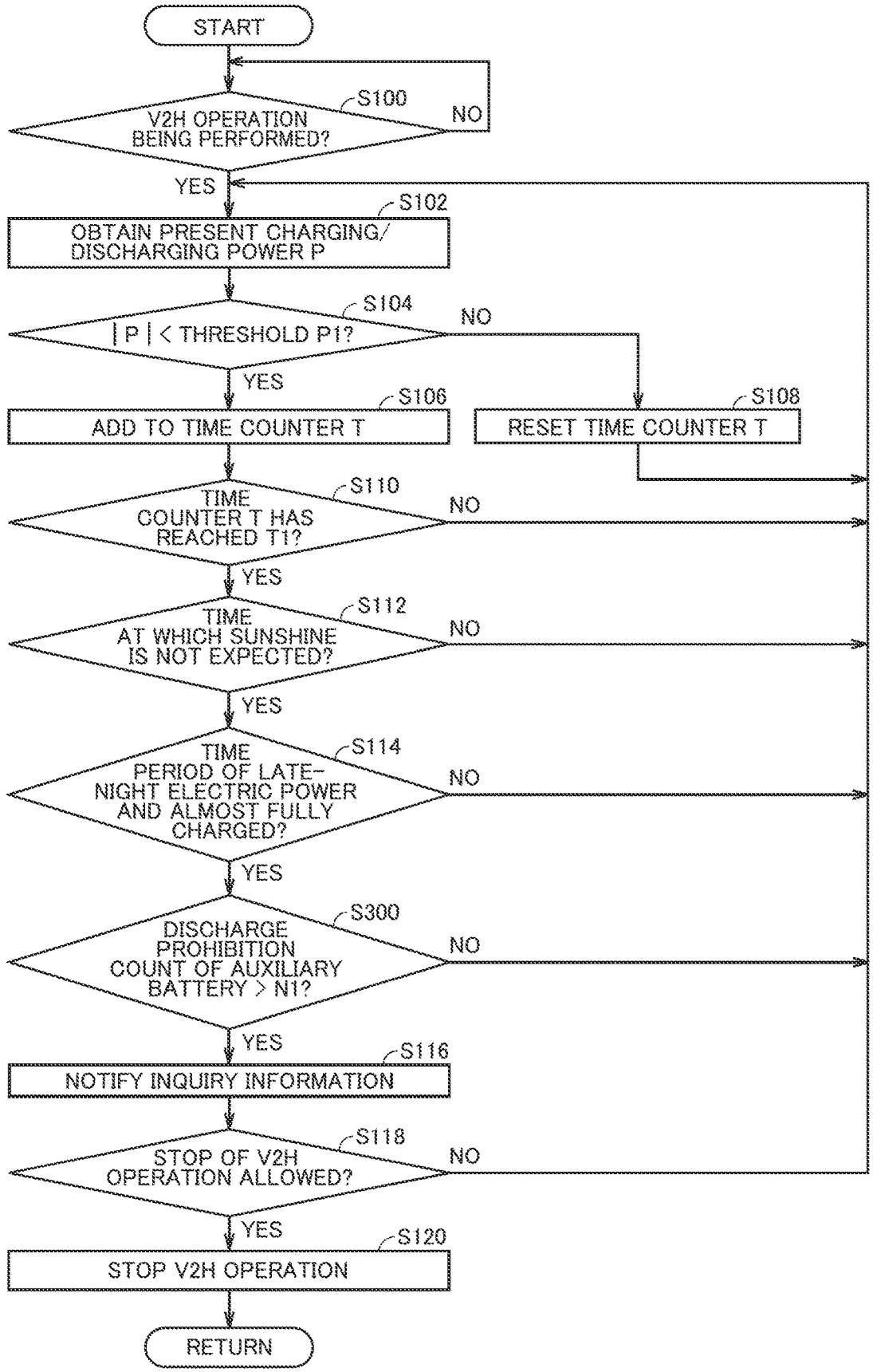
FIG. 7 is a flowchart (No. 4) showing an example process performed by an ECU in a variation.

An example process performed by ECU 100 in another variation will be described with reference to FIG. 7. FIG. 7 is a flowchart (No. 4) showing an example process performed by ECU 100 in the variation. The flowchart of FIG. 7 is different from the flowchart of FIG. 3 in that processing of S300 is included between processing of S114 and processing of S116. Any other processing, which is the same as the processing of the flowchart shown in FIG. 3, has the same step number allotted. Thus, detailed description of such processing will not be repeated except for the point described below.

As shown in the flowchart of FIG. 7, the process proceeds to S300 when the present time is a time within a time period of late-night electric power and power storage device 29 is almost fully charged (YES at S114).

At S300, ECU 100 determines whether the discharge prohibition count of an auxiliary battery is greater than threshold N1. Since the discharge prohibition count is as described above, detailed description thereof will not be repeated. When ECU 100 determines that the discharge prohibition count of the auxiliary battery is greater than threshold N1 (YES at S300), the process proceeds to S116. When ECU 100 determines that the discharge prohibition count is not greater than threshold N1 (NO at S300), the process returns to S102.

Thus, inquiry information is notified when the first condition, the second condition, the third condition, and the fourth condition are satisfied. When electric power has not been supplied and received and also when vehicle 20 is continuously not operated, accordingly, the user can be urged to stop the V2H operation.

The above embodiment has provided description assuming that when the first condition, the second condition, and the third condition are satisfied, inquiry information is notified and the V2H operation is stopped as a result of the notification that stop is allowed. Alternatively, the V2H operation may be restarted when the V2H operation is stopped as the first condition, the second condition, and the third condition are satisfied and when at least any of the first condition, the second condition, and the third condition is not satisfied.

Figure 8:
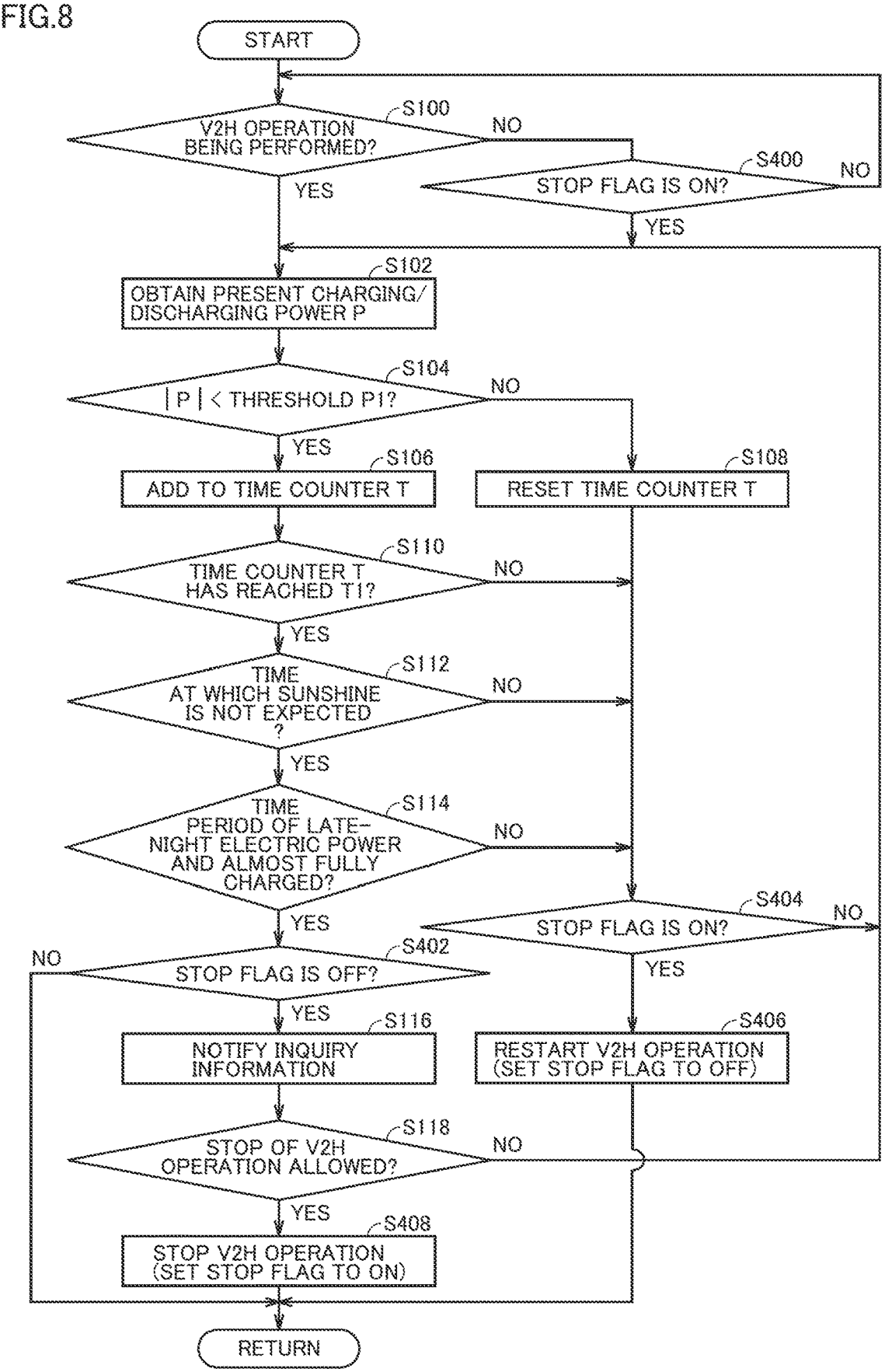
FIG. 8 is a flowchart (No. 5) showing an example process performed by an ECU in a variation.

An example process performed by ECU 100 in another variation will be described below with reference to FIG. 8. FIG. 8 is a flowchart (No. 5) showing an example process performed by ECU 100 in the variation. The flowchart of FIG. 8 is different from the flowchart of FIG. 3 in that processing of S400, processing of S402, processing of S404, and processing of S406 are added and processing of S408 is performed in place of processing of S120. Any other processing, which is the same as the processing of the flowchart shown in FIG. 3, has the same step number allotted. Thus, detailed description of such processing will not be repeated except for the point described below.

As shown in the flowchart of FIG. 8, when ECU 100 determines that the V2H operation is not being performed (NO at S100), the process proceeds to S400.

At S400, ECU 100 determines whether a stop flag is in ON state. When the stop flag is in ON state, it is indicated that the first condition, the second condition, and the third condition are satisfied as described below, and that the V2H operation has been stopped as the user has allowed to stop the V2H operation. The process proceeds to S102 when ECU 100 determines that the stop flag is in ON state (YES at S400). The process returns to S100 when ECU 100 determines that the stop flag is not in ON state (NO at S400).

The process proceeds to S402 when ECU 100 determines that the present time is a time within a time period of late-night electric power and power storage device 29 is almost fully charged (YES at S114).

At S402, ECU 100 determines whether the stop flag is in OFF state. The process proceeds to S116 when ECU 100 determines that the stop flag is in OFF state (YES at S402). The process ends when ECU 100 determines that the stop flag is in ON state (NO at S402).

The process proceeds to S404 after time counter T is reset (S108), when ECU 100 determines that time counter T has not reached T1 (NO at S110), when ECU 100 determines that the present time is not a time at which sunshine is not expected (NO at S112), or when ECU 100 determines that the present time is not a time within a time period of late-night electric power or power storage device 29 is not almost fully charged (NO at S114).

At S404, ECU 100 determines whether the stop flag is in ON state. The process proceeds to S306 when ECU 100 determines that the stop flag is in ON state (YES at S404). The process returns to S102 when ECU 100 determines that the stop flag is not in ON state (NO at S404).

At S406, ECU 100 restarts the V2H operation. ECU 100 transmits a signal indicating a request to perform the V2H operation to HEMS 11 and also closes SMR 21 and charging/discharging relay 26. ECU 100 further sets the stop flag to OFF state.

When ECU 100 determines that stop of the V2H operation has been allowed (YES at S118), the process proceeds to S408.

At S408, ECU 100 stops the V2H operation. Since the operation of stopping the V2H operation is similar to the operation of stopping the V2H operation of S120, detailed description thereof will not be repeated. At this time, ECU 100 sets the stop flag to ON state.

Thus, inquiry information is notified (S116) when the first condition, the second condition, and the third condition are satisfied and when the stop flag is in OFF state (YES at S402), and the V2H operation is stopped and the stop flag is set to ON state when stop of the V2H operation is allowed (YES at S118).

Thus, when the V2H operation is stopped (NO at S100) and when the stop flag is in ON state (YES at S400), ECU 100 determines whether each of the first condition, the second condition, and the third condition is satisfied. When at least any condition is not satisfied (NO at S110, NO at S112, or NO at S114), then, the stop flag is ON state (YES at S404), and accordingly, ECU 100 restarts the V2H operation.

Thus, when it is highly likely that supply and reception of electric power will be requested between power storage device 29 and house 10, the charging and discharging system can be activated to restart the V2H operation, thereby supplying and receiving electric power between power storage device 29 and house 10 with high responsiveness in response to the request.

Some or all of the variations described above may be appropriately performed in combination.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An electric power system comprising:
   a vehicle on which a power storage device is mounted;
   a charging and discharging system that supplies and receives electric power between the vehicle and a facility external to the vehicle;
   a photovoltaic power generation device that supplies electric power generated using sunlight to the charging and discharging system;
   a notification device that notifies a user of predetermined information;
   and a controller that notifies inquiry information using the notification device when a first condition and a third condition are satisfied, the inquiry information inquiring whether stop of the charging and discharging system is allowed, wherein
   the first condition includes a condition that magnitude of the electric power supplied and received between the power storage device and the facility is smaller than a threshold,
   a second condition includes a condition that a present time is a time within a time period in which an amount of electric power generated by the photovoltaic power generation device is smaller than a threshold,
   and the third condition includes a condition that (i) the present time is a time within a time period in which an electricity rate lower than an electricity rate of any other time period of a day is set, and (ii) an amount of electric power stored in the power storage device is within a prescribed range corresponding to a fully charged state.

2. The electric power system according to claim 1, wherein the controller activates the charging and discharging system when the charging and discharging system is stopped and when a state in which at least any of the second condition and the third condition is satisfied changes to a state in which the at least any of the second condition and the third condition is not satisfied.

3. An electric power system comprising:
   a vehicle on which a power storage device is mounted;
   a charging and discharging system that supplies and receives electric power between the vehicle and a facility external to the vehicle;
   a photovoltaic power generation device that supplies electric power generated using sunlight to the charging and discharging system; and
   a controller that controls the charging and discharging system, wherein
   the controller stops the charging and discharging system when all conditions of a first condition, a second condition, and a third condition are satisfied,
   the first condition includes a condition that magnitude of the electric power supplied and received between the power storage device and the facility is smaller than a threshold,
   the second condition includes a condition that a present time is a time within a time period in which an amount of electric power generated by the photovoltaic power generation device is smaller than a threshold, and
   the third condition includes a condition that (i) the present time is a time within a time period in which an electricity rate lower than an electricity rate of any other time period of a day is set, and (ii) an amount of electric power stored in the power storage device is within a prescribed range corresponding to a fully charged state.

4. The electric power system according to claim 3, wherein the controller activates the charging and discharging system when the charging and discharging system is stopped and when a state in which at least any of the second condition and the third condition is satisfied changes to a state in which the at least any of the second condition and the third condition is not satisfied.

* * * * *